Dec. 16, 1930.  J. B. WHIPPLE  1,785,020
CLING STONE FRUIT PITTER
Original Filed July 31, 1924  4 Sheets-Sheet 3

Dec. 16, 1930.   J. B. WHIPPLE   1,785,020
CLING STONE FRUIT PITTER
Original Filed July 31, 1924    4 Sheets-Sheet 4

Inventor:
J. B. Whipple
by Hazard and Miller
Attorneys

Patented Dec. 16, 1930

1,785,020

UNITED STATES PATENT OFFICE

JAMES B. WHIPPLE, OF HUNTINGTON PARK, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

CLINGSTONE-FRUIT PITTER

Application filed July 31, 1924, Serial No. 729,316. Renewed January 19, 1927.

This invention is a cling stone fruit pitter and consists of the novel features herein shown, described and claimed.

An object is to make a foot power machine to which peaches or the like may be manually fed one at a time to split the meat into two pieces and separate the pits from the meat.

Other objects and advantages will appear from the drawings and specification.

The drawings illustrate the construction and operation of a cling stone fruit pitter embodying the principles of my invention.

Figure 1:
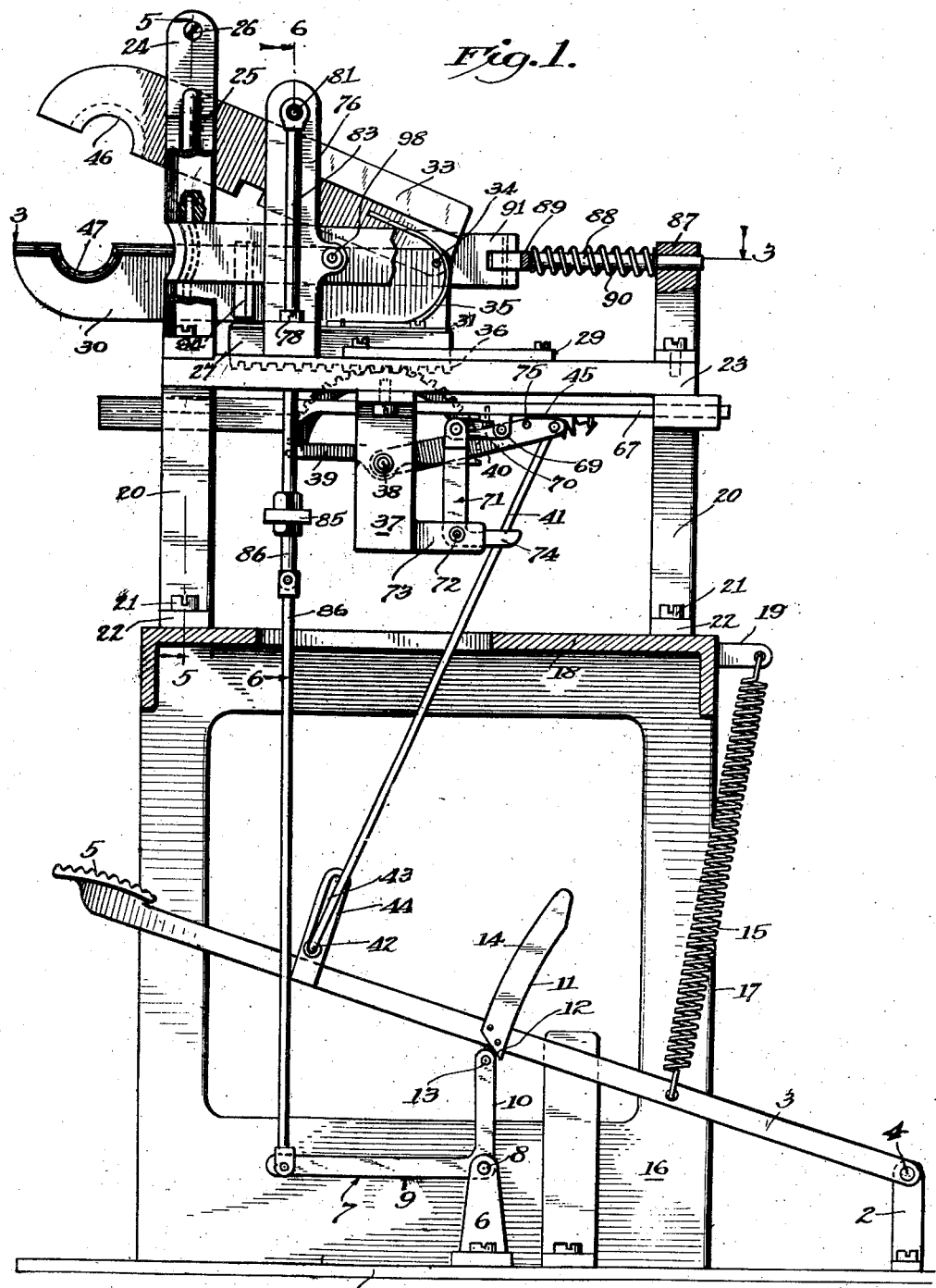
Figure 1 is a side elevation of the complete machine, parts being broken away and shown in section, the view being taken looking in the direction indicated by the arrow 1 in Fig. 3, and the parts being shown in normal positions ready to start the operation.
Figure 2:
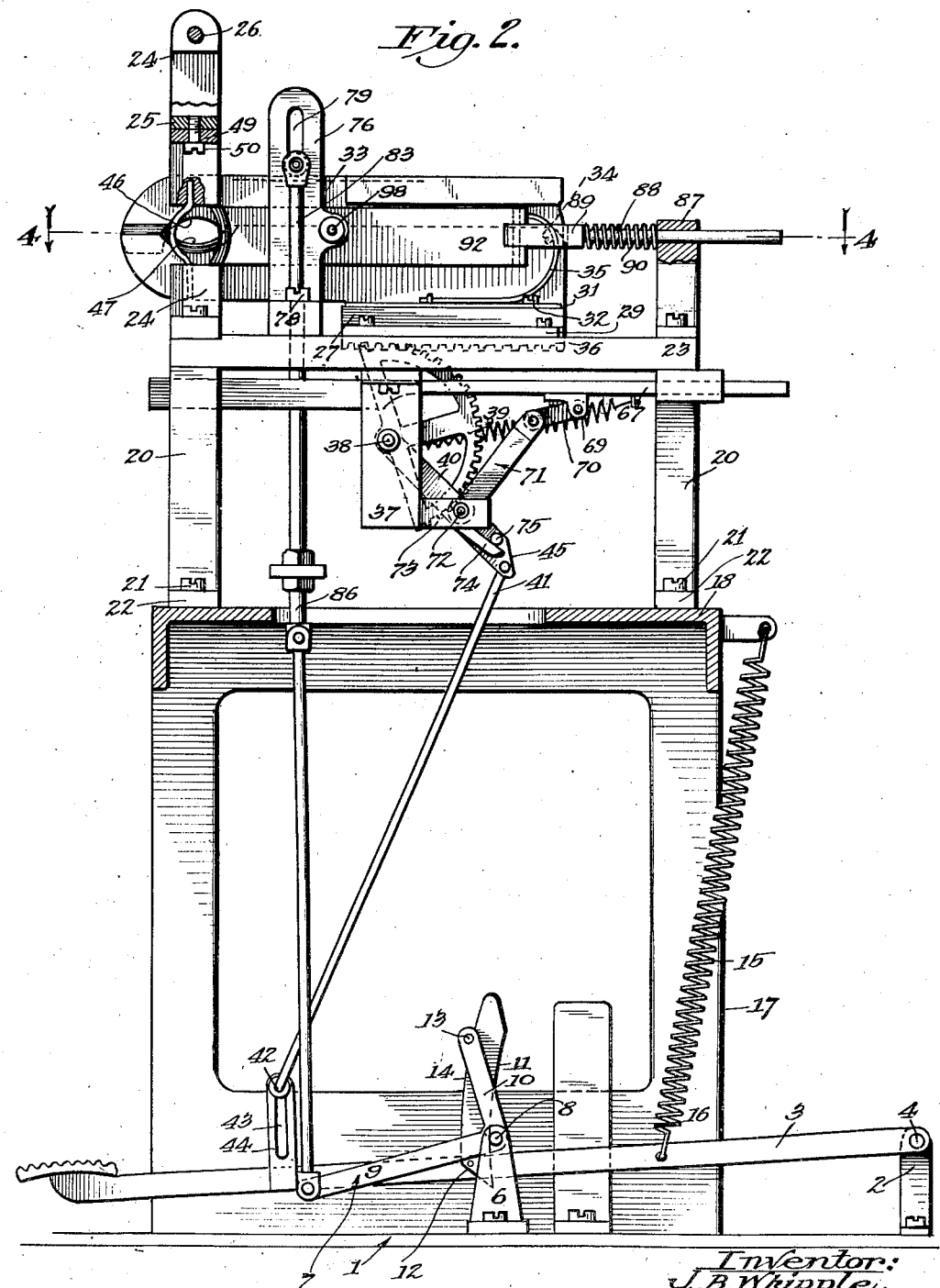
Fig. 2 is a view analogous to Fig. 1 and taken looking in the direction indicated by the arrow 2 in Fig. 4, the parts being in positions as at or near the close of the operation of pitting a peach.
Figure 3:
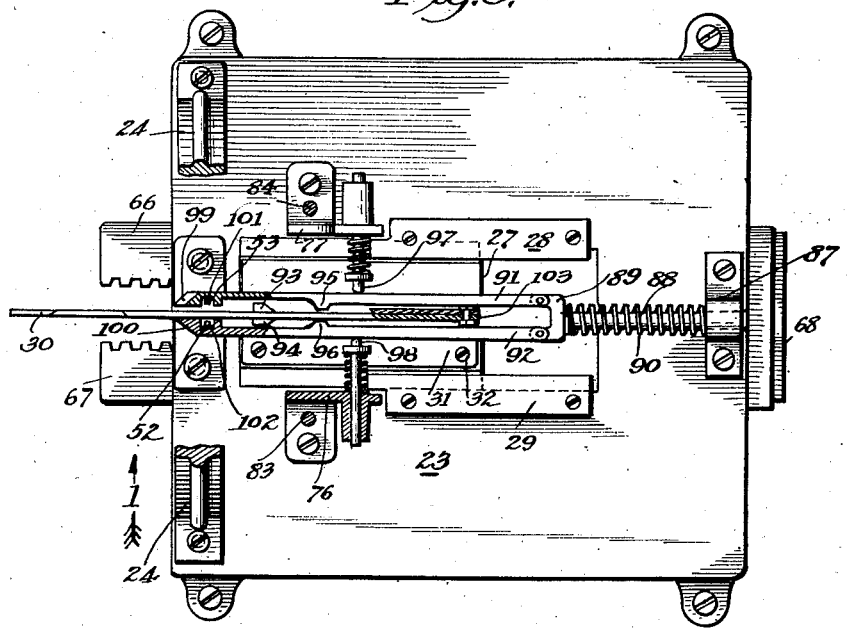
Fig. 3 is a horizontal section on the line 3—3 of Fig. 1.

The details of construction and operation shown in the drawings are as follows:

The base 1 is adapted to rest upon a floor. A post 2 extends upwardly from the extreme back side of the base 1 at the transverse center. A foot lever 3 is connected to the upper end of the post 1 by a pivot 4 and a pedal 5 is fixed upon the forward end of the lever 3 at the front of the machine. A post 6 extends upwardly from the center of the base 1 and a bell crank lever 7 is connected to the upper end of the post 6 by a pivot 8. The lever 7 consists of a horizontal arm 9 extending forwardly from the post 6 and a vertical arm 10 extending upwardly from the pivot 8. A cam 11 is fixed upon the lever 3 and has a cam face 12 upon its lower end to engage a pin 13 fixed through the upper end of the arm 10 and the cam 11 has a face 14 concentric to the pivot 4 so that when the pedal 5 is pressed downwardly the bell crank lever 7 will be quickly operated to throw the forward end of the arm 9 downwardly until the pin 13 passes to the face 14, and continued downward movement of the pedal will hold the bell crank lever in its tilted position. A strong retractile coil spring 15 is connected to the lever 3 and to a rigid part of the frame, the tension of the spring being exerted to hold the pedal 5 in its elevated position.

A secondary base 16 is rigidly mounted upon the base 1. Posts 17 extend upwardly from the base 16 a considerable distance and a top 18 is mounted upon the posts 17. The bracket 19 extends from the top 18 and the upper end of the coil spring 15 is connected to the bracket 19. Posts 20 are rigidly mounted upon the top 18 by bolts 21 inserted through ears 22 and tapped into the top 18. A platform 23 is mounted upon the posts 20. A pair of posts 24 is mounted transversely at the front end of the platform 23 and supports a head 25 formed in two pieces, one piece upon each post, and the pieces being connected by a cap screw 26.

A block 27 is mounted in guide ways 28 and 29 upon the platform 23 to reciprocate forwardly and backwardly. A lower meat cutting and pit holding blade 30 has a flange 31 secured to the block 27 by cap screws 32. The upper meat cutting and pit holding blade 33 is connected to the blade 30 by a pivot 34, and a U-shaped leaf spring 35 is secured to the blades 30 and 33, the tension of the spring being exerted to throw the forward end of the blade 33 upwardly. A gear rack 36 extends downwardly from the bottom of the block 27. Brackets 37 extend downwardly from the platform 23. A shaft 38 is mounted in the brackets 37 and carries a segmental gear 39 in mesh with the rack 36. A lever 40 is rigidly connected to operate the segmental gear 39, said lever extending backwardly. A link 41 connects the rear end of the lever 40 to the foot lever 3, there being a pin 42 transversely through the lower end of the link, and said pin operating in a slot 43 in an arm 44 secured to the lever 3 so as to produce lost motion to the extent of the slot 43. The rear upper face 45 of the lever 40 engages the rigid part of the machine to limit the upward movement of the lever, thereby limiting the forward movement of the block 27, and so that when the pedal 5 is pressed downwardly to its limit the block 27 is moved backwardly.

The blades 30 and 33 are flat and comparatively thin, and their cutting edges fit side by side like a shear, there being arched portions 46 and 47 in the edges to receive and grip the pit of a peach. A slot 48 is formed from the lower face of the head 25 and the blade 33 operates in this slot when in its upper position. A bearing block 49 is secured against the lower face of the head 25 by cap screws 50 and has a slot 51 registering with the slot 48. The bowed meat separators 52 and 53 have upper pintles 54 and 55 journaled in the block 49 on opposite sides of the slot 51. Bearings 56 and 57 are mounted upon the platform 23 and the separators 52 and 53 have spindles 58 and 59 extending downwardly through the bearings 56 and 57 and through the platform 23 and through a housing 60. The housing 60 is box-shaped, open at the front and back and secured against the lower face of the platform 23 by cap screws 61. A gear 62 is fixed upon the lower end of the spindle 59 and a gear 63 is fixed upon the spindle 58 in a plane above the gear 62. The spindles 58 and 59 are comparatively close together and the spindle 59 extends through a concentric slot in the gear 63 and the spindle 58 extends through a concentric slot in the gear 62.

A gear rack 64 is mounted to slide in the housing 60 and meshes with the gear 62, and a second gear rack 65 is mounted to slide in the housing 60 in mesh with the gear 63. The racks 64 and 65 have arms 66 and 67 extending straddle of the segmental gear 39 to the back end of the platform 23 and the extreme rear ends of the arms are connected by a cross bar 68.

A bearing block 69 is connected to the arms 66 and 67. A link 70 is connected to the bearing block 69. A bell crank lever 71 is connected to the link 70 and pivotally mounted upon a bolt 72 carried by bearings 73 extending from the lower end of the bracket 37. The horizontal arm 74 of the bell crank lever 71 extends backwardly from the bolt 72 into position to be engaged by a pin 75 carried by the rear end of the lever 40 so that when the pedal 5 is operated to the lower end of its stroke the pin 75 will engage the arm 74 and move the racks 64 and 65 backwardly, thereby rotating the separators 52 and 53 outwardly and forwardly around the pit of a peach held by the blades 30 and 33, the blades being closed to cut the meat of the peach in two parts and grip the pit between the arched portions 46 and 47 by the operation of the segmental gear 39 against the gear rack 36, thereby moving the block 27 backwardly.

Pedestals 76 and 77 are mounted upon the platform 23 in transverse alinement a short distance back of the posts 24 and secured in place by bolts 78. Vertical transversely alined slots 79 and 80 are formed from near the upper ends of the pedestals downwardly. A cross head rod 81 is mounted through the slots 79 and 80 and through a sleeve 82 fitting between the upper ends of the pedestals. The blade 33 bears upwardly against the sleeve 82. Cross head links 83 and 84 are connected to the outer ends of the cross head rod 81 and extend downwardly slidingly through the platform 23 and the lower ends of the links 83 and 84 are connected by a second cross head 85 and a jointed rod 86 is connected to the center of the cross head 85 and extends downwardly through the top 18 and is connected to the forward end of the bell crank lever 7 so that when the pedal 5 is pressed downwardly the first thing that happens is the downward movement of the forward end of the blade 33 to cut the meat of a peach in two parts and grip the pit.

A bearing block 87 is mounted upon the rear end and transverse center of the platform 23. A shaft 88 is slidingly mounted through the bearing block 87. A cross head 89 is formed at the forward end of the shaft 88. An expansive coil spring 90 is mounted upon the shaft 88 between the cross head 89 and the bearing block 87, the tension of the spring being exerted to move the cross head 89 forwardly. Arms 91 and 92 are pivotally connected to the cross head 89 and extend forwardly upon opposite sides of the blades 30 and 33. Cams 93 and 94 are fixed upon the sides of the blades 30 and beveled lugs 95 and 96 extend inwardly from the arms 91 and 92 to be engaged by the cams 93 and 94 to spread the forward ends of the arms 91 and 92 apart. Spring actuated pins 97 and 98 bear against the arms 91 and 92. Meat spreader edges 99 and 100 are formed at the extreme forward end of the arms 91 and 92 and normally bear against the sides of the blades 30 and 33.

Pockets 101 and 102 are formed in the inner faces of the arms 91 and 92 immediately behind the edges 99 and 100 and the bowed separator 53 and 52 are normally in these pockets. The rear edges 103 of the blades 30 and 33 are adapted to strike the cross head 89 after the cams 93 and 94 engage the lugs 95 and 96, and continued backward movement of the block 27 will compress the spring 88, and when the movement of the block is reversed the spring 88 will return the cross head 89 and connected parts to normal positions.

The parts are all normally in the poistions shown in Fig. 1. The operator will manually grasp a peach, apricot, or the like and place it upon the blade 30 over the arched portion 47, preferably with the stem end of the fruit backwardly, and hold the fruit as well centered as is practical. Then the operator will press one foot upon the pedal 5 and the blade 33 is immediately swung downwardly to cut the meat of the fruit in two parts and grip the pit between the arched portions 46 and 47. Continued downward movement of the pedal 5 will move the blades 30 and 33 carrying the fruit backwardly and the edges 99 and 100 will enter the cut between the two pieces of meat, and continued downward movement of the pedal will move the blades backwardly until the cams 93 and 94 engage the lugs 95 and 96 and spread the edges 99 and 100 apart, thereby spreading the contiguous portions of the meat apart, and continued operation will rotate the bowed separators 52 and 53 away from the blades 30 and 33 out of the pockets 101 and 102 and the bowed separators will pass around the pit, forcing the meat away from the pit, and the operation of cutting the fruit in two pieces and separating the pit from the fruit is complete. The pedal 5 is released and the parts returned to their normal positions.

Figure 4:
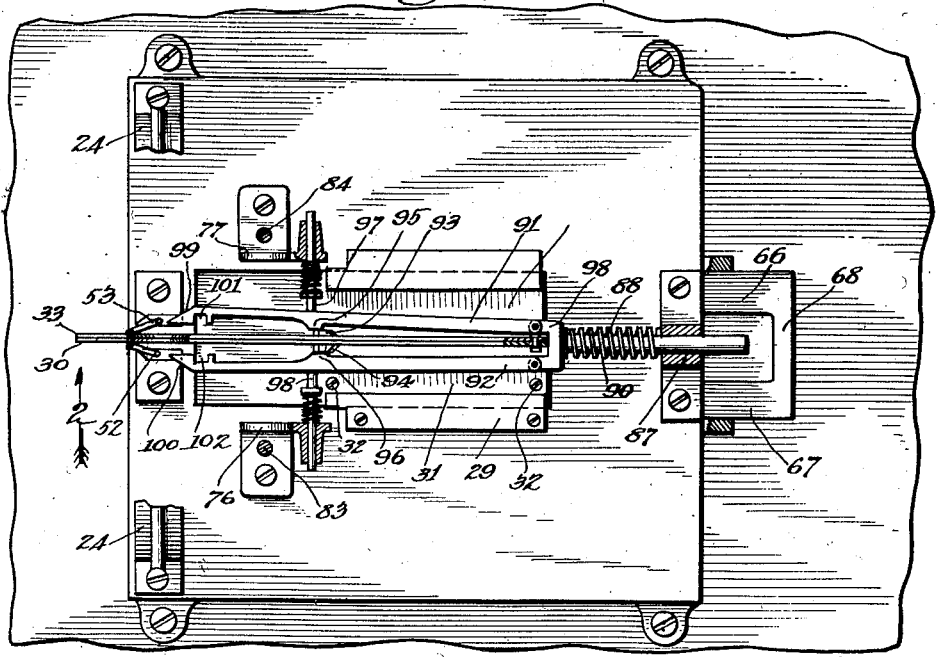
Fig. 4 is a horizontal section on the line 4—4 of Fig. 2.
Figure 5:
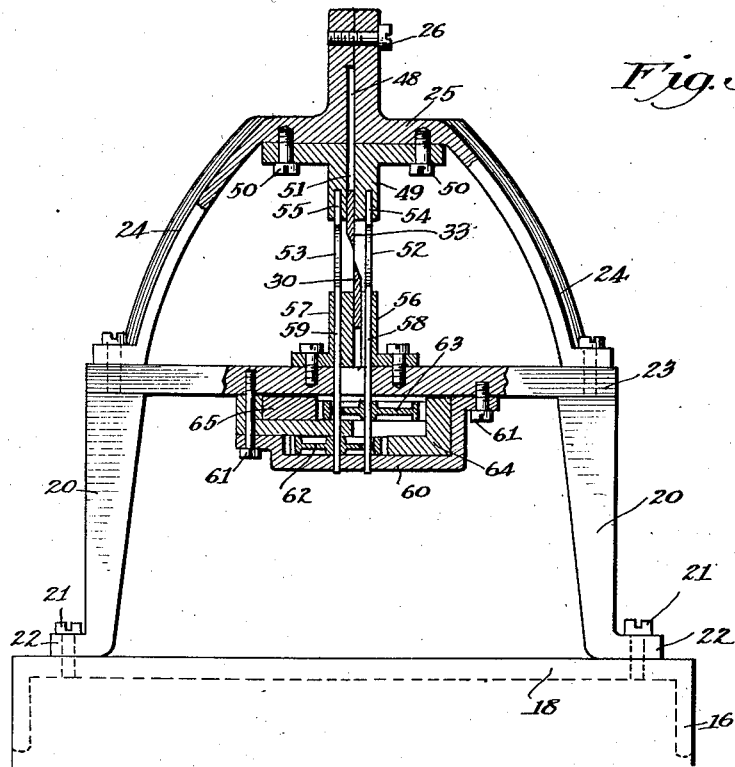
Fig. 5 is a vertical cross section on the line 5—5 of Fig. 1.
Figure 6:
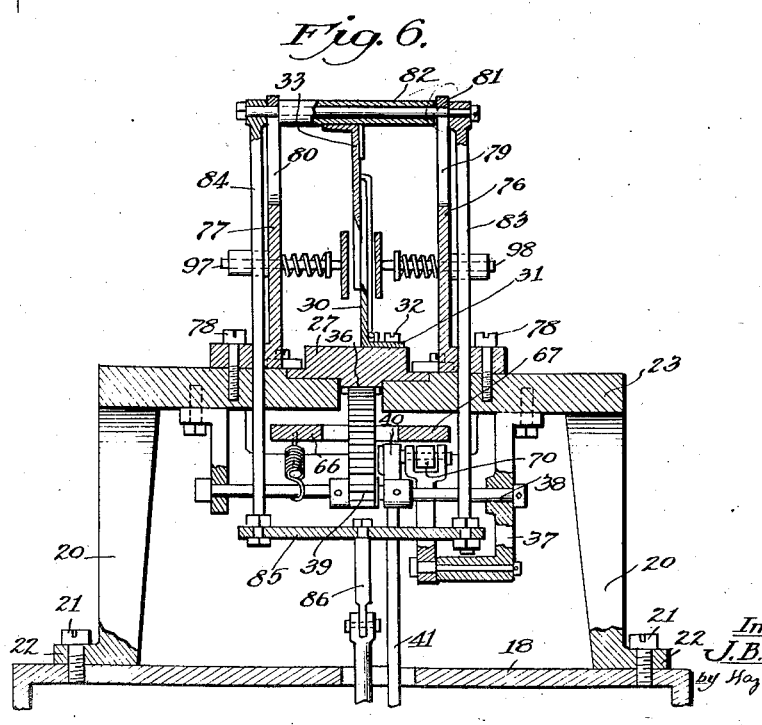
Fig. 6 is a vertical cross section on a plane parallel with Fig. 5 and on the line 6—6 of Fig. 1.

At the end of the operation the edges 103 of the blades 30 and 33 engage the cross head 89 and move the edges 99 and 100 backwardly, while the separators 52 and 53 are in their forward positions as in Fig. 4, so as to release the pit.

Thus I have produced a foot operated pitter to which peaches and the like may be manually fed one at a time and the meat cut in two parts and separated from the pit.

Various changes may be made without departing from the spirit of the invention as claimed.

I claim:

1. A fruit pitter comprising a lower blade rigidly mounted to slide forwardly and backwardly, a second blade pivoted to the first blade and adapted to swing to and from the first blade, said blades being adapted to cut the meat of a peach or the like into two parts and hold the pit, and means having meat spreader edges mounted at the outer sides of the blades and adapted to separate the meat from the pit as the blades are reciprocated.

2. A pitter comprising a lower blade rigidly mounted to slide forwardly and backwardly, a second blade pivoted to the first blade, means for swinging the second blade to and from the first blade, the blades being adapted to cut a fruit in two pieces and having arched portions to clear the pit, means having edges at the sides of the blades and adapted to enter the cut in the fruit, means for moving the blades to carry the fruit toward the edges, means for spreading the edges outwardly, and bowed separators adapted to move around the pit and separate the meat from the pit.

3. In a fruit pitter, two blades operatively mounted to receive a fruit and cut the meat in two pieces and hold the pit, arms pivotally mounted at the sides of the blades and having edges adapted to enter the cut in the fruit, and means for moving the blades to carry the fruit against the edges.

4. In a fruit pitter, two blades operatively mounted to receive a fruit and cut the meat in two pieces and hold the pit, arms pivotally mounted at the sides of the blades and having edges adapted to enter the cut in the fruit, means for moving the blades to carry the fruit against the edges, and means for spreading the edges to spread the fruit.

5. A pitter comprising a blade rigidly mounted and adapted to slide forwardly and backwardly, a second blade mounted in opposition to the first blade, the blades being adapted to receive a peach or the like, cut the meat in two pieces and hold the pit, arms pivotally mounted at the sides of the blades and having edges against the sides of the blades and adapted to enter the cut in the meat, bowed separators normally at the sides of the blades back of the edges and inside of the arms, means for moving the blades carrying the fruit toward the edges, means for spreading the edges apart, and means for operating the bowed separators to pass around the pit and separate the meat from the pit.

In testimony whereof I have signed my name to this specification.

JAMES B. WHIPPLE.